Aug. 28, 1934.  E. C. SPARLING  1,971,510
DAMPING ERROR PREVENTING MEANS
Filed Oct. 24, 1929   3 Sheets-Sheet 1

INVENTOR
ERIC C. SPARLING.
BY
Herbert H. Thompson
his ATTORNEY.

Aug. 28, 1934.      E. C. SPARLING      1,971,510
DAMPING ERROR PREVENTING MEANS
Filed Oct. 24, 1929      3 Sheets-Sheet 2

INVENTOR
*Eric C. Sparling.*
BY
*Herbert H. Thompson*
his ATTORNEY.

Aug. 28, 1934.　　　　E. C. SPARLING　　　　1,971,510
DAMPING ERROR PREVENTING MEANS
Filed Oct. 24, 1929　　　3 Sheets-Sheet 3

INVENTOR
ERIC C. SPARLING.
BY
Herbert H. Thompson
his ATTORNEY.

Patented Aug. 28, 1934

1,971,510

UNITED STATES PATENT OFFICE 1,971,510

DAMPING ERROR PREVENTING MEANS

Eric C. Sparling, Garden City, N. Y., assignor to Sperry Gyroscope Company, Inc., Brooklyn, N. Y., a corporation of New York Application October 24, 1929, Serial No. 402,224

7 Claims. (Cl. 33—226)

This invention relates to means for preventing errors in gyroscopic compasses which ordinarily arise during turning of the ship or vehicle upon which the compass is mounted. While such errors are small, it is important that they be eliminated or reduced for accurate naval compasses, and to this end it has been proposed to eliminate or greatly reduce the damping factor of the gyroscopic compass during the turning or acceleration of the ship, since it was found that such errors were primarily due to the damping factor or means. Such a method of dealing with the problem, however, has certain disadvantages. If the ship is maneuvering rapidly, for instance, it is turning or changing speed a large portion of the time, and in such event the normal damping of the compass would be so seriously reduced as to affect its operation. Then too the elimination of the damping gives rise to a change in settling point of the compass which introduces another small error.

According to my invention I propose to leave the damping factor substantially untouched so that the damper acts on the compass at all times but to introduce a correction factor preferably applied by a selected portion of a standard correction device employed on the Sperry compass which will prevent any oscillations being set up by the damping factor. My invention is shown as applied to such a compass with a mercury ballistic attachment, but it will be understood that the general principle may be applied to other types of compasses within the scope of the appended claims.

I have found that the cause of this error due to the damper is primarily because during the turning or acceleration of the ship a flow of mercury takes place between the boxes of the mercury ballistic, which results in pressure on the gyro casing through the usual eccentric connection. The component of this torque about the horizontal axis is necessary to produce the proper ballistic deflection of the compass. The vertical component, however, i. e. damping torque, produces during the turn a precession of the gyroscope about its horizontal axis, or in other words, gives the gyroscope a tilt so that after the turn is completed this tilt of the gyroscope results in oscillation of the gyroscope until it again settles level on the virtual meridian. Since, however, the subsequent deviation or oscillation of the gyroscope is caused by the gravitational factor or mercury ballistic by reason of the tilted gyroscope imparting a tilt thereto, I propose to shift a mass on the gravitational factor which will neutralize the torque due to the tilt of the ballistic and thus prevent a torque being exerted thereby on the inclined gyroscope. The amount and direction of such shift depends upon known factors, namely, the north-south component of the ship's speed and the latitude, so that for every speed, course and latitude there is a definite position of the mass. Since the Sperry compass is normally equipped with a correction device for correcting the readings of the compass in accordance with the same factors, I find it convenient to position such mass from a selected portion of the usual correction device of the compass.

Referring to the drawings in which the preferred form of the invention is disclosed, Fig. 1 is an east elevation, partly in section, of a gyroscopic compass of the Sperry type equipped with my invention.

Figure 1:
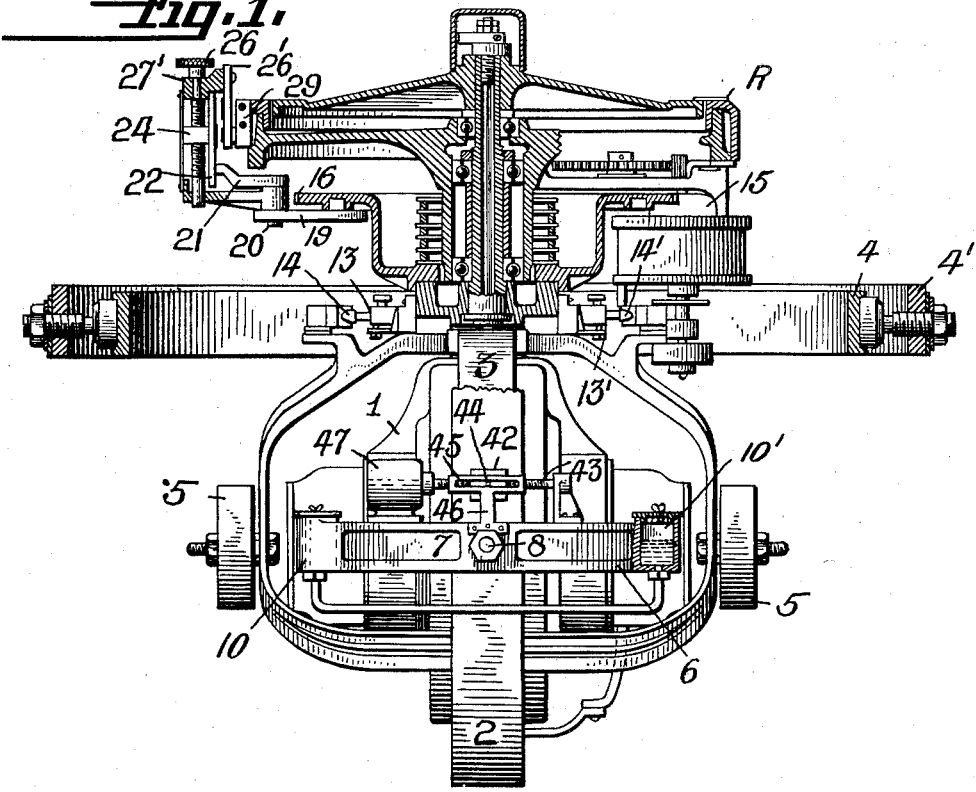

In the compass shown in Fig. 1, the usual rotor casing is shown at 1, the follow-up ring at 2, the vertical ring at 3, and the gimbal rings at 4 and 4'. The compass is shown as provided with the usual compensating weights 5 and gravitational factor 6, which, in this instance, is a mercury ballistic comprising a frame-work 7 pivoted at 8 on the follow-up ring and carrying two pairs of inter-connected mercury boxes 10—10' and 11—11'. The follow-up ring is driven in any suitable manner from follow-up contacts 13—14 and 13'—14' between the follow-up ring and vertical ring, which contacts drive the follow-up or azimuth motor 15. Said motor rotates the follow-up ring and the usual transmitter 15' through the annual gear 16. The compass is also provided with some form of correction device for correcting the readings of the compass so that the card will indicate the true meridian rather than the virtual meridian indicated by the sensitive element. Such a correction device is well known in the art and the theory of the same need not be described in detail, being set forth in the prior patent to Sperry No. 1,255,480 dated February 5, 1918.

Figure 2:
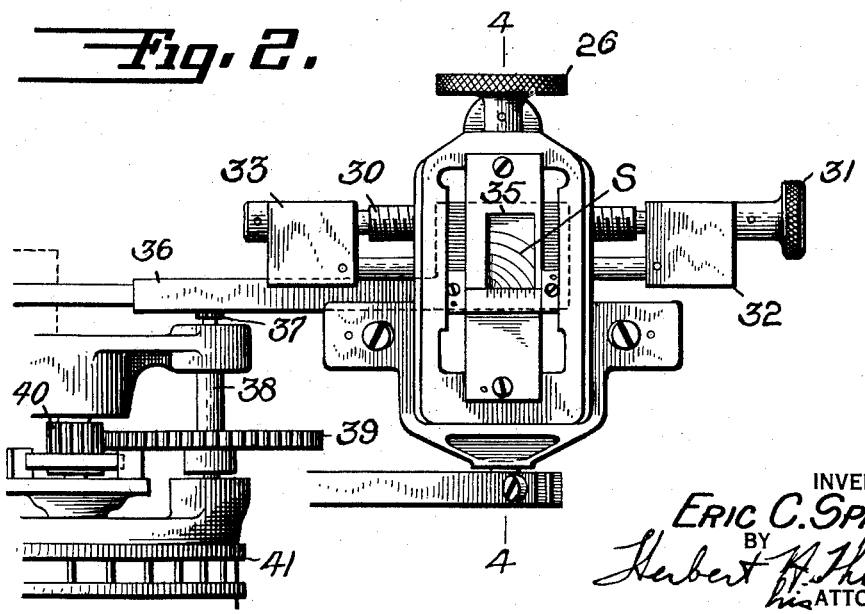
Fig. 2 is an enlarged side elevation of a portion of the correction device showing my invention applied thereto.
Figure 4:
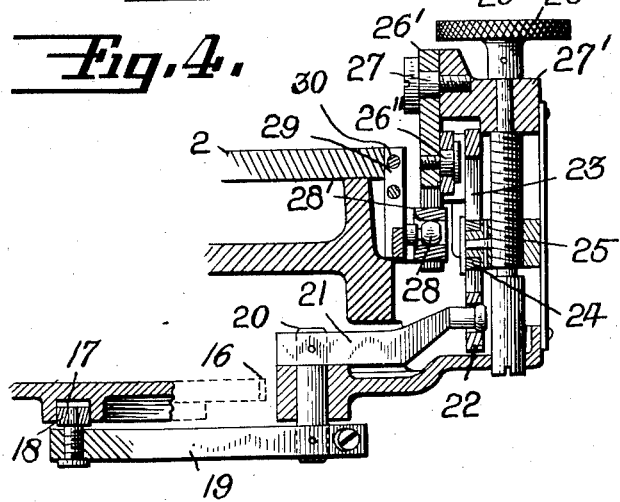
Fig. 4 is a vertical section view taken approximately on line 4—4 of Fig. 2.

The correction is made in accordance with the equation $$D = \frac{K \cos H}{E \cos L} \pm B \tan L$$

where D represents the total correction, K is the linear speed of the ship, H the angle the ship's course makes with the true geographical north, E the earth's linear velocity at the equator, L the latitude, and B a constant. As shown, the undersurface of the large gear 16 is provided with a cam groove 17, which is eccentric with respect to the vertical center line of the compass. In said groove there runs a roller 18 (Fig. 4) on arm 19 pinned to the stub shaft 20, to the upper end of which is also pinned an arm 21. The outer end of said arm is loosely swiveled in a lever 22 (Fig. 4) having a vertical slot 23 therein. An adjustable pivot pin 24 is provided for said lever, said pin having a threaded aperture therethrough threaded on the vertical stem 25. By turning said stem by means of the knurled knob 26, said pin is adjusted toward or away from lever 21 so that the angular movement imparted to the lever 22 by lever 21 is varied. The upper end of lever 22 in turn is pivotally connected to the lever 26' at 26'', which lever in turn is journaled at 27 on the fixed support 27'. At its lower end said lever is loosely coupled through sliding apertured block 28' to a knob 28 projecting from a slidable piece 29 mounted on the lubber ring R. A threaded stem 30 passes through said piece, said stem having a knurled knob 31 thereon and being journaled at its ends in blocks 32—33 (Fig. 2) secured to the lubber ring. By turning said knob 31, therefore, the lubber ring will be moved with respect to the member 29 so that member 31 is used to impart the second part of the equation, namely, the part ±B tan L. The factor of the equation cos H introduced from the movement of the lever 21 is controlled by the cosine cam 17, and this factor is multiplied by the speed K and divided by E cos L by the setting of the knob 26 with respect to the engraved curves S of speed and latitude appearing in the window 35. Therefore, the movement of the member 29 with respect to datum, is proportional to the first member of the equation, namely, $$\frac{K \cos H}{E \cos L}$$

and this adjustment represents the proportional amount that it is desired to adjust the correction weight.

As a convenient means for carrying out my invention, I provide means for transmitting the amount of movement or adjustment of the member 29 down to the correction mass. To this end I provide an extension 36 from said member which may be provided with rack teeth. Said teeth are shown as meshing with a pinion 37 on shaft 38, on the lower end of which is a large gear 39 driving a pinion 40 of the transmitter 41. The movements of the transmitter are, therefore, multiplied many times with respect to the movement of the member 29.

According to my invention I mount on the gravitational factor the correction weight or mass 42 and provide means for adjusting it in the north-south direction. As shown, said mass is threaded on a threaded shaft 43 and is prevented from rotating by a pin 44 projecting therefrom and taking in a slot 45 in bracket 46. Rotation is imparted to said shaft by repeater motor 47 electrically connected to the aforesaid transmitter 41 so that for every speed, course and latitude there is a definite position that the mass 42 takes with respect to the gravitational factor, the position of the mass being such as to prevent the gravitational factor from exerting any torque on the compass due solely to the inclination the latter has by reason of the action of the damper during turning or acceleration. Said mass, however, will not affect the normal settling point of the compass or otherwise disturb the azimuth position of the same, since the mercury will always level itself. It will be obvious that the speed might be set in otherwise than by hand, if desired.

If desired, I may also mount on the ballistic a second adjustable mass 50, for the purpose of keeping the gyroscope approximately level for different latitudes. This mass is only adjusted for a function of latitude, it being shown as threaded on rotatable stem 51 which is turned by knob 52. This mass does not interfere with the correction effected by mass 47, since it remains normally fixed during changes of course and is only shifted slightly for appreciable latitude changes.

Figure 3:
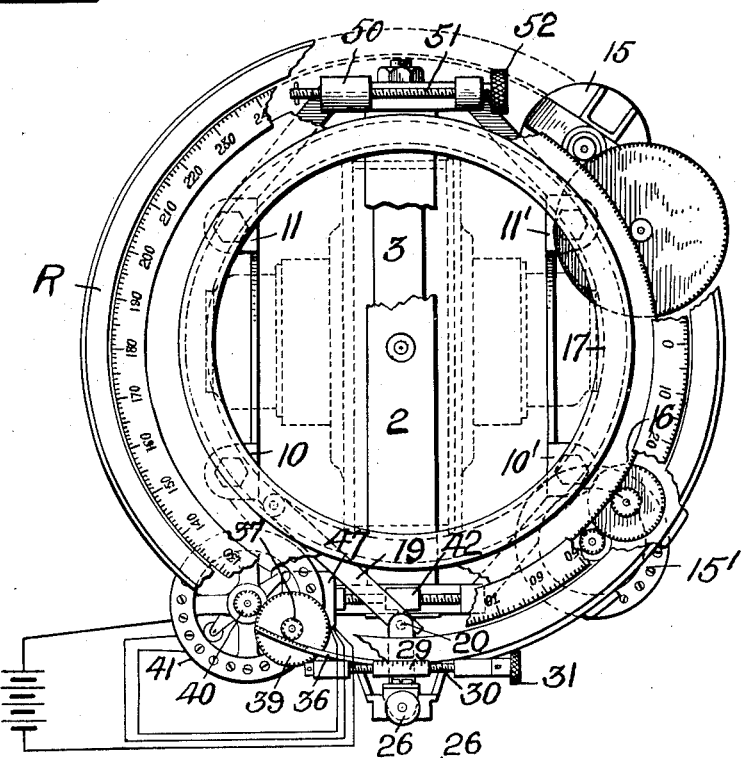
Fig. 3 is a plan view of the compass partly in section, the compass card having been removed for the sake of clearness.
Figure 5:
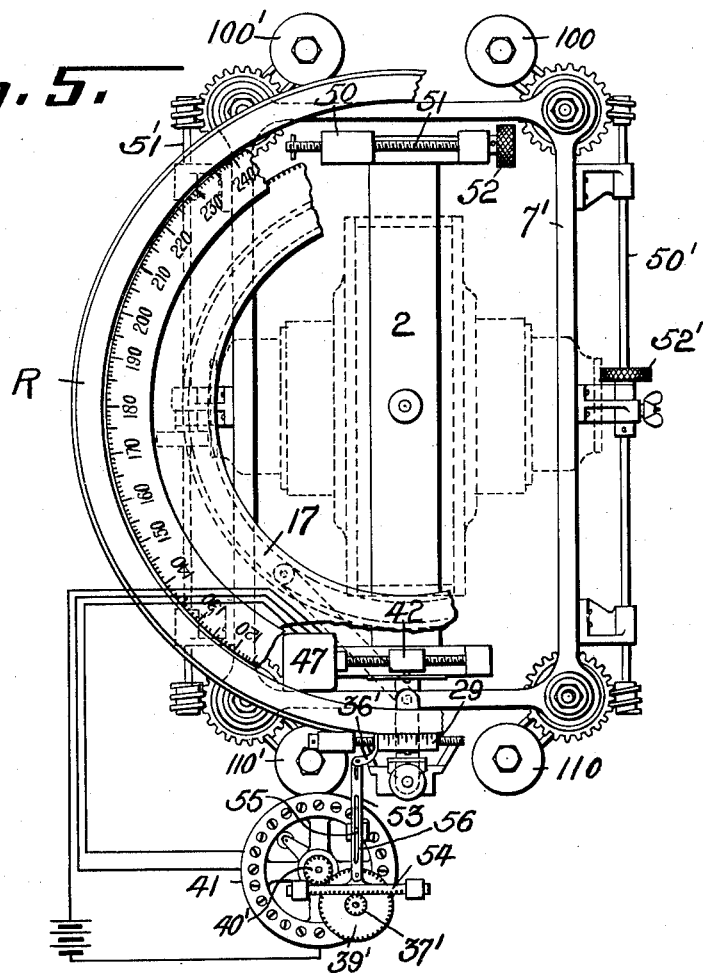
Fig. 5 is a sectional plan view similar to Fig. 3, but with parts broken away, showing a modified form of the invention.
Figure 6:
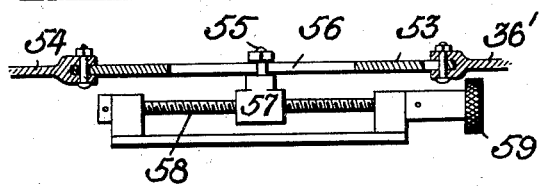
Fig. 6 is a detail of the modified correction device of this form of the invention.

An adaptation of my invention to a constant period compass is shown in Figs. 5 and 6. For accurate naval work, it has now become standard practice to vary the gravitational factor in accordance with a function of the latitude in order to maintain the 85 minute period of the compass in all latitudes, but when the gravitational factor is so varied it renders necessary an additional correction to the movement of the aforesaid mass 42 in order to annul the effect of the tilt due to changes of speed, course, and latitude. In Fig. 5 the mercury containers 100—100' and 110—110' are pivoted on the ballistic framework 7' and are adjustable in accordance with the latitude by means of worm shafts 50' and 51' from thumb pieces 52' substantially as described in the copending patent of Hight and Wainwright, No. 1,780,014 dated October 28, 1930. To compensate for this change in the gravitational factor, I introduce an additional correcting movement for mass 42 which is inversely proportional to the cosine of latitude. To effect this purpose I have shown the arm 36' projecting from the member 29 as pinned at one end to a lever 53. Said lever is shown as loosely pinned at its other end to a rack bar 54 meshing with the pinion 37' of multiplying gearing 39'—40' of the transmitter 41. Said lever is pivoted to an adjustable pin 55 which projects through a slot 56 in the lever. Said pin is shown as adjustable in accordance with the proper function of the latitude by having the base 57 thereof threaded on a stem 58 rotatable from a knob 59. By this means the movements of member 29 are multiplied by the proper factor and transmitted to the bar 54 and thus transmitted to the transmitter 41 which may be connected to the repeater motor 47 as in Fig. 3.

From the foregoing, the operation of my invention will be readily apparent. Suppose a ship steaming directly west should shift its course to directly north, the mercury would flow as a result of the change in the northerly component of the ship's speed from the north to the south boxes during the turn and thus impart proper ballistic deflection, after which the mercury would again substantially level itself. Due to this flow a slight tilt would be also imparted to the compass by the eccentric connection or damping factor. Such tilt, however, would be prevented from setting up an oscillation of the compass by the simultaneous shifting of the mass 42 which would prevent any torque being exerted on the compass by the gravitational factor due to such tilt. In other words, the gyroscope would remain tilted a very few minutes of arc without affecting its azimuth position as long as the ship maintained its speed and course. In case the ship turned back again to its original course, the weight would be shifted in the opposite direction. In case of change of speed, the speed dial would be reset either by hand or automatically resulting in a similar shift of the mass. Where the gravitational factor is adjustable for latitude, an additional latitude correction is set in by knob 59 (Fig. 5).

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and element in the combination and relations described, some of these may be altered and others omitted without interfering with the more general results outlined, and the invention extends to such use.

Having described my invention, what I claim and desire to secure by Letters Patent is:

1. In a gyro compass having a damping mechanism acting about its vertical axis, and a gravitational factor, of means for correcting the readings thereof for course, speed and latitude errors in accordance with the expression $$\frac{K \cos H}{E \cos L} \pm B \tan L,$$

a mass movably mounted on said factor, and means controlled from that portion of the correction device which introduces the first member of said equation for shifting said mass in the N—S direction on said factor an amount sufficient to prevent the damping error that would otherwise occur.

2. In a gyro compass having a damping mechanism acting about its vertical axis, and a gravitational factor, of means for correcting the readings thereof for course, speed and latitude errors, an electrical transmitter actuated in accordance with the movement of a portion of said means, and a repeater motor actuated from said transmitter for shifting the relative position of the center of gravity of said gravitational factor and the center of support of the gyro compass an amount sufficient to prevent the damping error that would otherwise occur following acceleration or change of course.

3. In a gyro compass having a damping mechanism acting about its vertical axis and a gravitational factor, of two-part means for correcting the readings of the compass for course, speed and latitude errors in accordance with the expression $$\frac{K \cos H}{E \cos L} \pm B \tan L,$$

a mass movably mounted on said factor, means controlled from that portion of the correction device which introduces the first member of said expression for shifting said mass in the N—S direction on said factor an amount sufficient to prevent the damping error that would otherwise occur, means for adjusting the gravitational factor to maintain the period constant, and additional means adapted to be set in accordance with adjustment of the gravitational factor for introducing a correction into the amount said mass is shifted by said first named means to compensate for the changes in the gravitational factor.

4. In a gyro compass having a damping mechanism acting about its vertical axis, and a gravitational factor, of a mass on the gravitational factor adjustable in the N—S direction, means for correcting the readings of the compass for course, speed and latitude errors, and means controlled from said correction means for shifting said mass in the N—S direction an amount sufficient to prevent the damping error that would otherwise occur.

5. The combination in a gyro compass having a damping mechanism acting about its vertical axis and a gravitational factor, of a mass movably mounted in a N—S direction on said gravitational factor, a correction device settable in accordance with speed and latitude and actuated from the compass in accordance with the heading, and means for adjusting the position of said mass from said device in accordance with the N—S component of the heading an amount sufficient to prevent the damping error that would otherwise occur.

6. In a gyro compass, a sensitive element, a follow-up element, a motor for driving the latter from the former, a correction device for shifting the lubbers line to correct the readings of the follow-up element, a transmitter for transmitting the correctional movements of said device, a shiftable mass on the sensitive element for preventing errors due to changes in speed and course, and a repeater motor actuated from said transmitter for shifting said mass.

7. In a gyro compass having a variable gravitational factor adjustable in accordance with the latitude and a damping means acting about the vertical axis, of a mass mounted on said factor and independently adjustable, and means for automatically so adjusting said mass in a N—S direction to prevent the damping error upon change of the N—S component speed including means for varying the amount of said movement also in accordance with the latitude.

ERIC C. SPARLING.